United States Patent
Bednarz, Jr. et al.

(10) Patent No.: US 8,687,945 B2
(45) Date of Patent: Apr. 1, 2014

(54) EXPORT OF PLAYBACK LOGIC TO MULTIPLE PLAYBACK FORMATS

(75) Inventors: Thomas E. Bednarz, Jr., Natick, MA (US); Norman A. Stratton, Littleton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1478 days.

(21) Appl. No.: 11/951,497

(22) Filed: Dec. 6, 2007

(65) Prior Publication Data

US 2014/0013229 A1    Jan. 9, 2014

(51) Int. Cl.
- *G11B 27/00* (2006.01)
- *H04N 5/93* (2006.01)
- *H04N 9/80* (2006.01)

(52) U.S. Cl.
USPC ............ 386/278; 386/239; 386/240; 386/248

(58) Field of Classification Search
USPC .......................... 386/232, 278–290, 239–240
See application file for complete search history.

(56) References Cited

U.S. PATENT DOCUMENTS

| | | | |
|---|---|---|---|
| 2004/0136698 A1* | 7/2004 | Mock | 386/123 |
| 2004/0223740 A1* | 11/2004 | Itoi | 386/95 |
| 2009/0044117 A1* | 2/2009 | Vaughan et al. | 715/716 |

\* cited by examiner

*Primary Examiner* — Hung Dang

(74) *Attorney, Agent, or Firm* — Kilpatrick Townsend & Stockton LLP

(57) ABSTRACT

Methods and apparatus provide for an abstract model interpreter that defines an abstract model to represent an interactive video. The abstract model is defined independent of any export format. An interface for the abstract model is created to concurrently manage interpreting the abstract model according to a plurality of different export formats. For example, the abstract model interpreter can map a feature of the interactive video, which is described in the abstract model, to a corresponding feature supported by an export format. The interface is thereby utilized to interpret the abstract model to create a formatted interactive video, which is a version of the abstract model compliant with an export format from the plurality of different export formats. The interface further provides an edit capability that allows a user to modify how the feature of the interactive video is to be supported by any of the different export formats.

22 Claims, 7 Drawing Sheets

EXPORT OF PLAYBACK LOGIC TO MULTIPLE PLAYBACK FORMATS

BACKGROUND

Conventional computer systems allow for the production and distribution of multimedia data, including video, audio and image data. Such production is increasing at a phenomenal rate due to the growing popularity of the Internet, the growing affordability of personal computers capable of efficiently processing multimedia data to provide a pleasing experience for users, as well as the fact that multimedia data is far superior to text-only data in conveying content-rich information.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

When a client requests a piece of media content such as digital video, audio, or some other sampled content from a server, the client typically provides the global address of the content in the form of a Uniform Resource Locator (URL). A server then accesses the content and sends or "streams" it to the client as a continuous data stream.

There are various file formats for streaming media content and composite media streams. Regardless of the streaming file format used, an individual data stream may contain a sequence of digital data sets or units. The units can represent an image, sound, or some other stimuli that is perceived by a human to be continuously varying. The client can render the units individually, or in sequence, to reproduce the original stimuli. For example, a video data stream includes a sequence of digitally specified graphics frames that are rendered in sequence to produce a moving picture.

SUMMARY

Conventional applications that render media suffer from a number of deficiencies. For example, some conventional video creation systems are based on a single format type, such as Digital Video Disc (DVD), Blu-Ray, Flash, etc. Once a video editor has created a video, the conventional system renders the video according to the single format for which the conventional system is designed to encode. If the video editor wishes to create a version of the same video in a different format, then the video editor must spend time, resources and effort recreating the entire video in another conventional video creation system that supports the different format.

Some conventional systems provide the capability of converting a video from one format to another format. Hence, redundancy in the video creation workflow is reduced. However, such conventional systems fail to generate multiple versions of the same video in different export formats while identifying how to best express the interactive playback logic of the original video in each different export format.

Embodiments disclosed herein can significantly overcome such deficiencies and/or other deficiencies in the prior art. The embodiments herein provide for an abstract model interpreter that can create multiple versions of an interactive video encoded according to different export formats. However, in contrast with conventional systems, as a version for a given export format(s) is created, the abstract model interpreter determines how to best emulate the original interactive video's playback logic within the constraints of the target export format.

For example, if an interactive video has a slideshow of images defined by playback logic that requires a user to press a button to advance through the slideshow, then the abstract model interpreter can create a version of the interactive video in the given export format(s) while maintaining the requirement of user interaction to advance through the slideshow. If the export format(s) has a different level of support for the user interaction which is required by the video's playback logic, the abstract model interpreter can detect the export format's limitations and create a version of the interactive video that is both compliant with the export format and best recreates the playback logic within the capabilities of the export format.

According to general embodiments, the abstract model interpreter defines an abstract model to represent an interactive video. The abstract model is defined independent of any export format. An interface for the abstract model is created to concurrently manage interpreting the abstract model according to a plurality of different export formats. For example, the abstract model interpreter can map a feature of the interactive video, which is described in the abstract model, to a corresponding feature supported by the export format. A feature can be an interactive mode for displaying the media (i.e. data, media) of the interactive video.

The interface is thereby utilized to interpret the abstract model to create a formatted interactive video which is a version of the abstract model compliant with an export format from the plurality of different export formats. The interface further provides an edit capability that allows a user to modify how the feature of the interactive video is to be supported by any of the different export formats.

In addition, during an instance where a particular export format only partially supports a feature, the abstract model interpreter can disable or change the appearance of particular video interface controls for that feature. Hence, the controls will appear in the formatted interactive video, but will be operative with respect to the aspects of the feature which are compliant with the export format.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an interface with distinct interaction models as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Methods and apparatus provide for an abstract model interpreter that defines an abstract model to represent an interactive video. The abstract model is defined independent of any export format. An interface for the abstract model is created to concurrently manage interpreting the abstract model according to a plurality of different export formats. For example, the abstract model interpreter can map a feature of the interactive video, which is described in the abstract model, to a corresponding feature supported by an export format. A feature can be an interactive mode for displaying the media (i.e. content, data) of the interactive video. The interface is thereby utilized to interpret the abstract model to create a formatted interactive video, which is a version of the abstract model compliant with an export format from the plurality of different export formats. The interface further provides an edit capability that allows a user to modify how the feature of the interactive video is to be supported by any of the different export formats.

Figure 1:
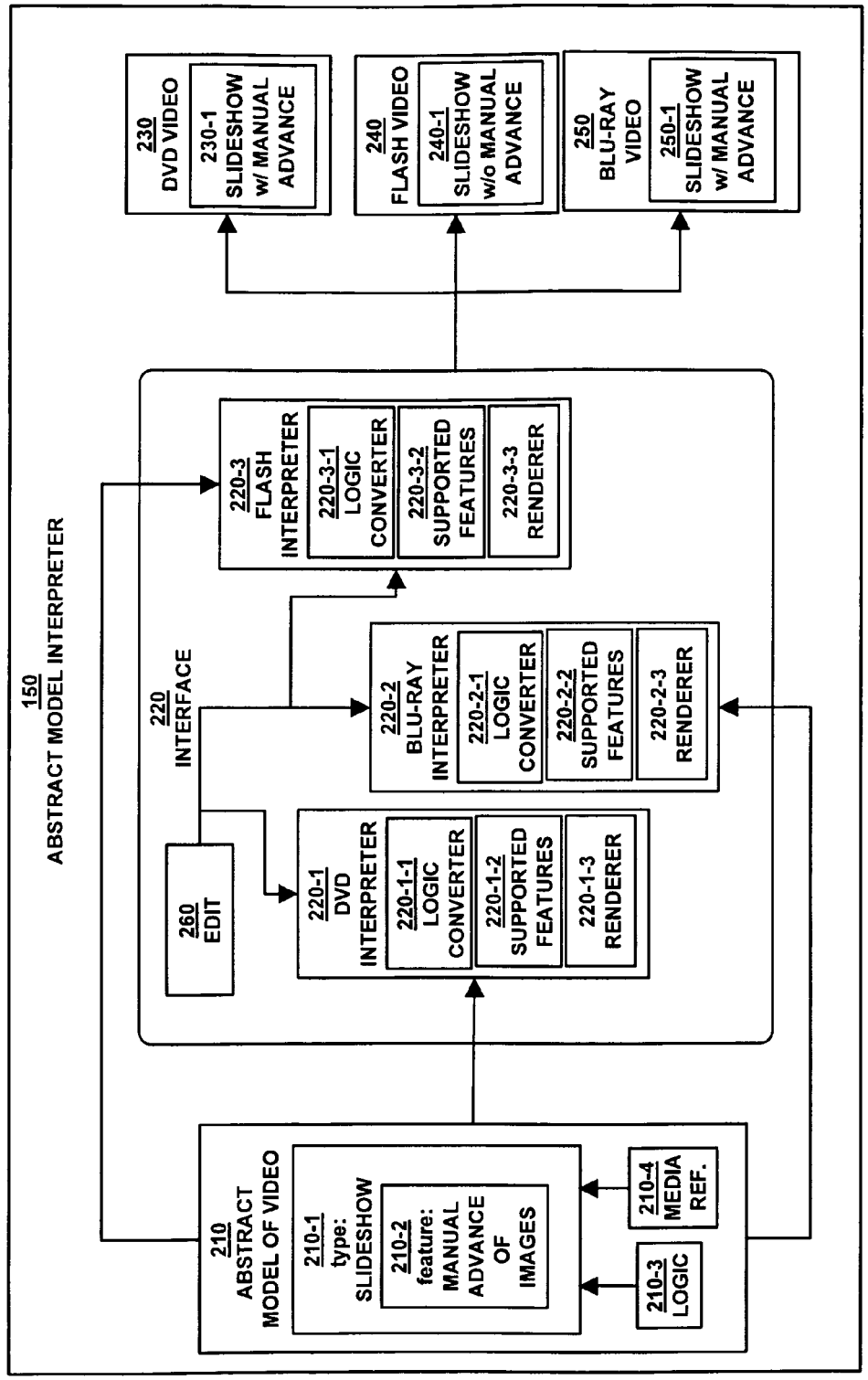
FIG. 1 is a block diagram of an example of a computer system configured with an abstract model interpreter according to embodiments herein.

FIG. 1 is a block diagram of an example of a computer system configured with an abstract model interpreter 150 according to embodiments herein. In particular, FIG. 1 illustrates an abstract model interpreter 150 which includes an abstract model 210 of an interactive video. The abstract model 210 is not encoded in any export format and defines a slideshow 210-1 of images (i.e. a sequence of still images that are played on a timeline).

The slideshow 210-1 has a feature that controls the amount of time each image is displayed before displaying the next image in the slideshow's sequence of images. For example, the slideshow 210-1 has a manual advance feature 210-2 that will display an image of the slideshow 210-1 to the user. In order to display the next image in the slideshow's sequence, the user must interact with the player that is playing the slideshow 210-1 (e.g. pressing a "next" button), at which time playback of the slideshow 210-1 resumes.

After the user has interacted with the slideshow 210-1, the next image in the slideshow 210-1 sequence is displayed and playback is again paused as the slideshow 210-1 waits for the user to again interact with the slideshow's player. Logic 210-3 that defines such interactive behavior of the slideshow 210-3 is further provided in the abstract model 210-1. In addition, the abstract model 210 includes media references 210-4 that describe the location(s) (e.g. memory storage locations) of the images used in the slideshow 210-1.

Since the abstract model 210 is not encoded according to any export format, the interface 220 can be utilized to concurrently interpret the abstract model 210 according to many different export formats. The interface 220 has a Digital Video Disc (DVD) interpreter 220-1 that receives and interprets the abstract model 210 to create a version of the abstract model 210 as a DVD video 230.

In addition, the interface 220 has a Blu-Ray interpreter 220-2 that receives and interprets the abstract model 210 to create a version of the abstract model as a Blu-Ray video 240. The interface 220 also has a Flash interpreter 220-3 that receives and interprets the abstract model 210 to create a version of the abstract model as a Flash video 250.

It is understood that the abstract model interpreter 150 is not limited to converting the abstract model 210 according to DVD, Blu-Ray and Flash export formats. Rather, embodiments of the abstract model interpreter 150 can be well suited for converting an abstract model 210 according to a variety of other export formats.

The DVD interpreter 220-1 includes a logic converter 220-1-1, a library of supported features for the DVD format 220-1-2 and a media renderer 220-1-3. The library of supported features 220-1-2 determines that the DVD export format has the capability to support the manual advance feature 210-2 described in the abstract model 210. The logic 210-3 that defines the interactive behavior of the slideshow 210-1 and the manual advance feature 210-2 is interpreted by the DVD interpreter 220-1.

The DVD interpreter 220-1 maps the manual advance feature 210-2 to a DVD compliant manual advance feature 230-1. The logic converter 220-1-1 thereby converts the logic 210-3 in the abstract model 210 into a command that can be processed by a DVD player to display new images in the slideshow sequence only when the user interacts with the DVD video 230 (e.g. selecting a "next" arrow on the user interface of the DVD video 230).

However, the manual advance feature in the D.V.D format requires that while playback is paused (i.e. displaying an image until the user interacts with the slideshow) accompanying audio is also paused. Thus, as the manual advance feature 210-2 described in the abstract model 210 is mapped to the DVD manual advance feature 230-1, the DVD interpreter 220-1 will express the manual advance feature 230-1 in the DVD video 230 in accordance with the requirement that audio is paused while playback is paused.

The media renderer 220-1-3 of the DVD interpreter 220-1 encodes the media (e.g. still images, menus, interface radio buttons) of the slideshow 210-1 to ensure that the media from the abstract model 210 is a DVD legal media asset. For example, the media renderer 220-1-3 can render the abstract model's 210 media according to an MPEG 2 video compression format. In addition, the media renderer 220-1-3 can ensure that the media has a proper image aspect ratio (e.g. 4:3 for full screen, 16:9 for wide screen).

In addition, the abstract model 210 can define video interface controls (e.g. radio buttons, menus, chapter markers, user command icons) that are to be presented in with the slideshow 210-1. The interactive behavior related to a selection of the video interface controls can be described in the logic 210-3 as well.

Since the DVD export format supports the manual advance feature 210-2, but will not play audio while the slideshow 210-1 is displaying an image, the DVD interpreter 220-1 will include the video interface controls in the abstract model 210 in the DVD video 230. However, the video interface controls will be modified to be operative for interactive behavior that is supported by the DVD export format. Thus, if the abstract model 210 defines a portion of the video interface controls for controlling audio playback while the slideshow 210-1 displays an image, the DVD interpreter 220-1 will not include that portion in the DVD video 230.

As with the DVD interpreter 220-1, the Blu-Ray interpreter 220-2 includes a logic converter 220-2-1, a library of supported features for the Blu-Ray format 220-2-2 and a media renderer 220-2-3. The library of supported features 220-2-2 determines that the Blu-Ray export format also has the capability to support the manual advance feature 210-2 described in the abstract model 210. The logic 210-3 that defines the interactive behavior of the slideshow 210-1 and the manual advance feature 210-2 is interpreted by the Blu-Ray interpreter 220-2 to map the manual advance feature 210-2 to a Blu-Ray compliant manual advance feature 250-1.

By interpreting the manual advance feature 210-2 via the Blu-Ray interpreter 220-2, the logic 210-3 is converted into a command that can be processed by a Blu-Ray player to display images from the slideshow 210-1 only when the user interacts with the Blu-Ray video 250 (e.g. selecting a "next" arrow on the user interface of the Blu-Ray video 250). Finally, the media renderer 220-2-3 of the Blu-Ray interpreter 220-2 encodes the media (e.g. still images, menus, interface radio buttons) of the slideshow 210-1 to ensure that the media from the abstract model 210 is a Blu-Ray legal media asset.

However, in contrast with the DVD format, the manual advance feature in the Blu-Ray format does not require that accompanying audio is paused while playback is paused (to show an image until the user interacts with the slideshow). Thus, as the manual advance feature 210-2 is mapped to the Blu-Ray manual advance feature 250-1, the Blu-Ray interpreter 220-2 will express the manual advance feature 250-1 in the Blu-Ray video 250 in accordance with the Blu-Ray format which allows audio to be played while each image in the slideshow 210-1 is being displayed.

The interface 220 also provides a Flash interpreter 220-3 that includes a logic converter 220-3-1, a library of supported features for the Flash format 220-3-2 and a media renderer 220-3-3. Unlike the DVD and Blu-Ray export formats, the library of supported features 220-3-2 determines that the Flash export format does not have the capability to support the manual advance feature 210-2 described in the abstract model 210. Hence, the Flash interpreter 220-3 will create a Flash version of the abstract model 210 without the manual advance feature 210-2.

Via the Flash interpreter 220-3, the logic 210-3 that defines the interactive behavior of the slideshow 210-1 and the manual advance feature 210-2 will be mapped to a default feature 240-1 (i.e. slideshow without manual advance) which allows the Flash video 240 to show each image in the slideshow 210-1 for a predefined amount of time before displaying the next image. The logic 210-3 is thereby converted into a command that can be processed by a Flash player to display images from the slideshow 210-1 for the prefined amount of time without requiring any user interaction. Finally, the media renderer 220-3-3 of the Flash interpreter 220-3 encodes the media (e.g. still images, menus, interface radio buttons) of the slideshow 210-1 to ensure that the media from the abstract model 210 is a Flash legal media asset.

Figure 2:
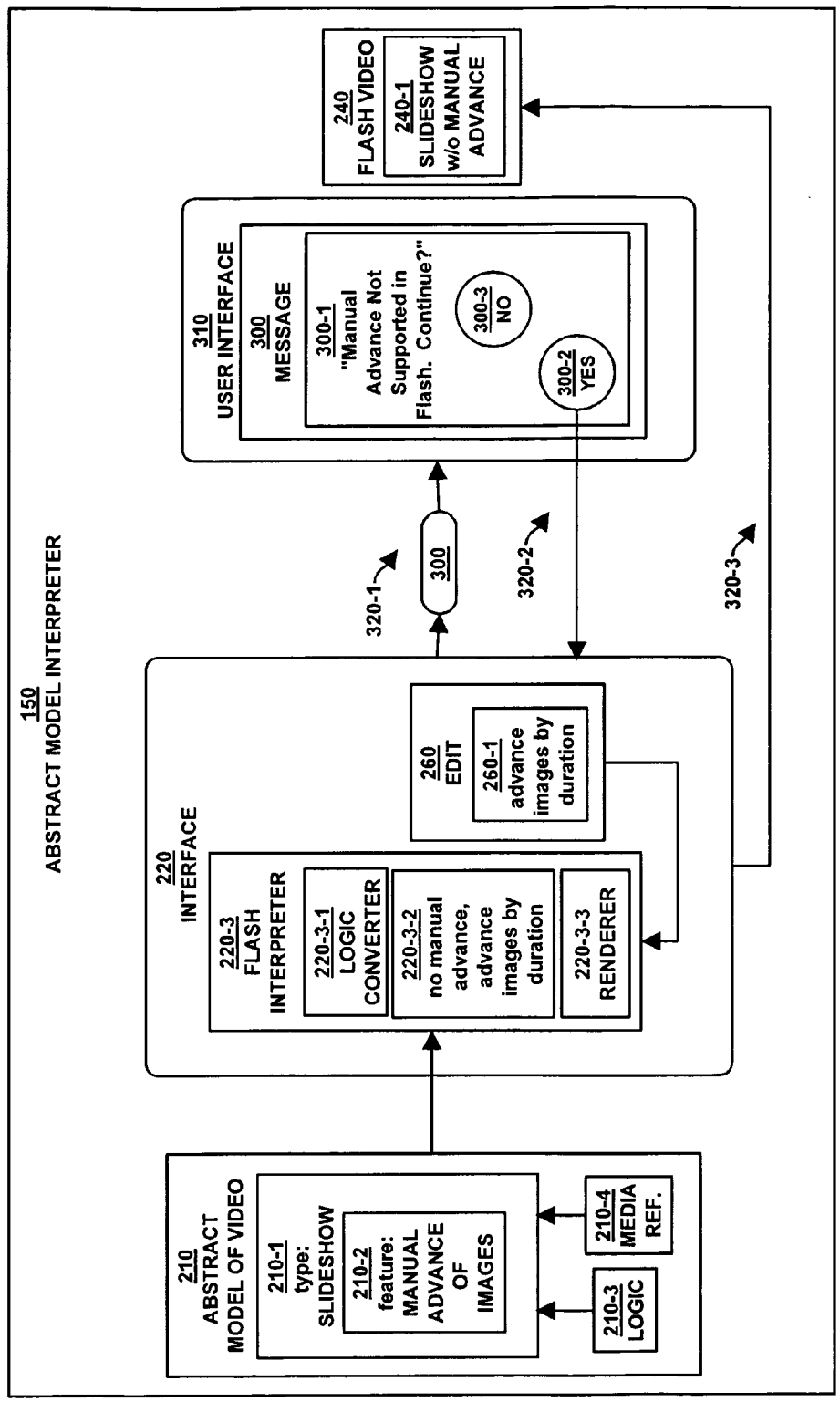
FIG. 2 is a block diagram of an example of a computer system configured with an abstract model interpreter according to embodiments herein.

FIG. 2 is a block diagram of an example of a computer system configured with an abstract model interpreter 150 according to embodiments herein. As illustrated in FIG. 2, the interface 220 provides an edit capability 260 that allows a user to modify how features of the abstract model 210 can be supported by export formats.

For example, the edit capability 260 allows the user to define how the Flash interpreter 220-3 interprets abstract models 210 that describe a manual advance feature 210-2. Since the Flash export format does not support the manual advance feature 210-2, the user can define a default feature 260-1 which displays each slideshow image for a duration of time before displaying the next image in the slideshow sequence. Thus, the library of supported features 220-3-2 (which includes the default feature 260-1) in the Flash interpreter 220-3 is used to create a Flash video 240 that advances the slideshow according to the default feature 260-1.

However, prior to creating the Flash video 240, the Flash interpreter 220-3 detects that the manual advance feature 210-2 is not supported. The interface 220 creates a message 300 that is sent to a user interface 310 (see 320-1). The user interface displays the message 300 which includes information 300-1 that the manual advance feature 210-2 is not supported. The information 300-1 in the message 300 can be more specific in other embodiments. For example, the information 300-1 can communicate to the user that a Flash version of the slideshow will be created according to the default feature 260-1 (i.e. showing slideshow images for a predefined duration of time).

The user is provided with two radio buttons ("Yes" 300-2, "No" 300-3) in the user interface 310 with regard to continuing the process of interpreting the abstract model 210 according to the Flash export format. If the user selects the "No" button 300-3, then the abstract model interpreter 150 will halt the process and not create the Flash video 240. If the user selects (see 320-2) the "Yes" button 300-2, then the abstract model interpreter 150 will continue to interpret the abstract model 210 according to the default feature 260-1 described in the library of supported features 220-3-2.

Thus, the Flash video 240 will be created with a slideshow 240-1 that shows each image in the slideshow sequence for a predefined duration of time before displaying the next image in the sequence. Hence, the abstract model 210 is interpreted by the interface 220 to create a Flash video 240 that best emulates the logic 210-3 of the slideshow 210-1 within the capabilities of the Flash export format.

Figure 3:
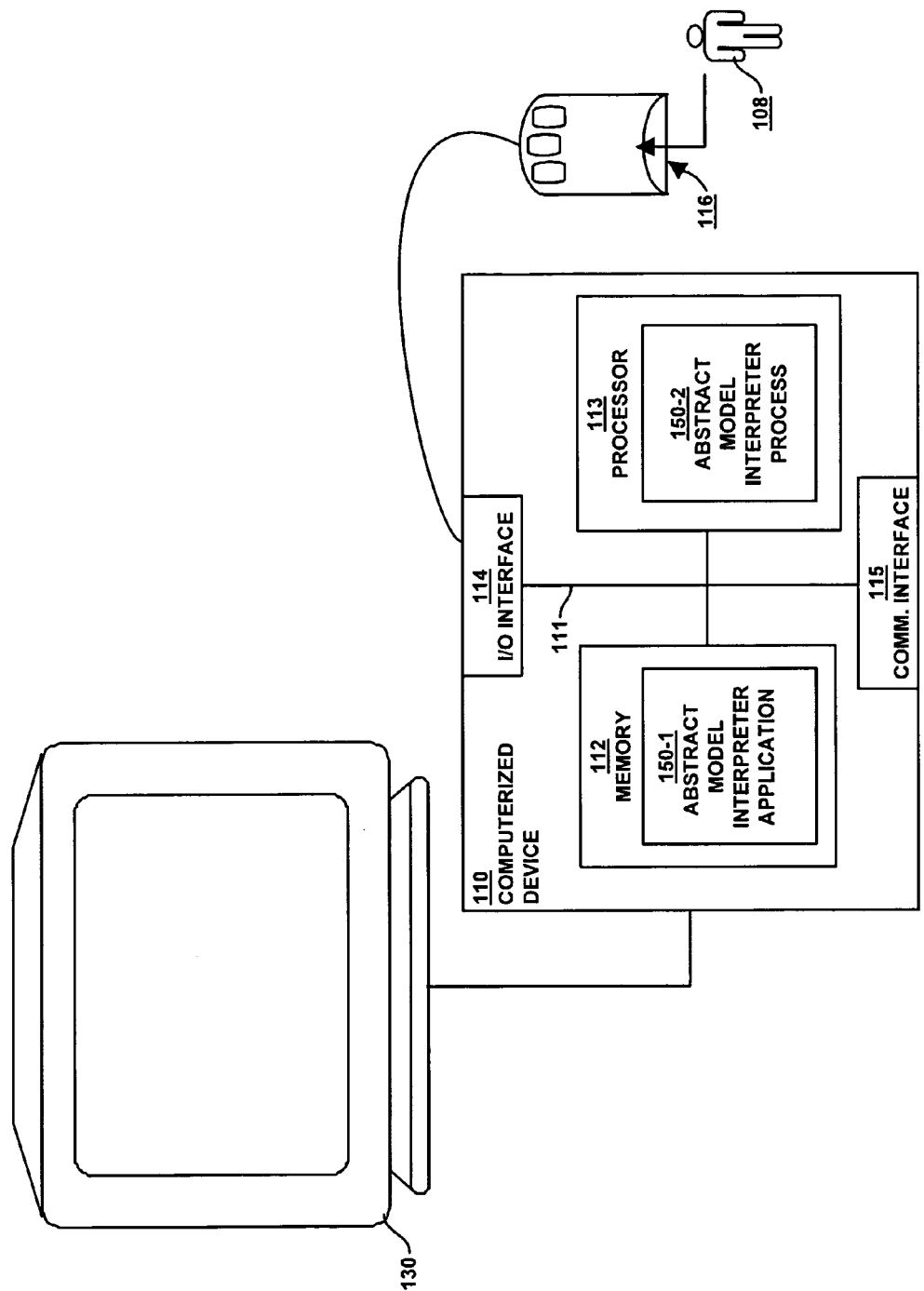
FIG. 3 is a block diagram of an example of an architecture for a computer system configured with an abstract model interpreter according to embodiments herein.

FIG. 3 is a block diagram of an example of an architecture for a computer system 110 that executes, runs, interprets, operates or otherwise performs an abstract model interpreter application 150-1 and/or abstract model interpreter process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the abstract model interpreter 150. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. Further, aspects of the abstract model interpreter application 150-1 and/or the abstract model interpreter process 150-2 can be distributed over a networked environment.

The memory system 112 can be any type of computer readable medium and, in this example, is encoded with an abstract model interpreter application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the abstract model interpreter application 150-1. Execution of the abstract model interpreter application 150-1 in this manner produces the abstract model interpreter process 150-2. In other words, the abstract model interpreter process 150-2 represents one or more portions or runtime instances of the abstract model interpreter application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the abstract model interpreter application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the abstract model interpreter application 150-1. Execution of the abstract model interpreter application 150-1 in this manner produces processing functionality in an abstract model interpreter process 150-2. In other words, the abstract model interpreter process 150-2 represents one or more portions or runtime instances of the abstract model interpreter application 150-1 (or the entire targeted advertisement application 150-1) performing or executing within or upon the processor 113 in the computerized device 110 at runtime.

With regard to flowcharts 400, 500, 600 and 700 illustrating embodiments of the abstract model interpreter 150, the rectangular elements of FIGS. 4-7 are herein denoted "processing blocks" and represent computer software instructions or groups of instructions upon a computer readable medium. Alternatively, the processing blocks represent steps performed by functionally equivalent circuits such as a digital signal processor circuit or an application specific integrated circuit (ASIC).

The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 4:
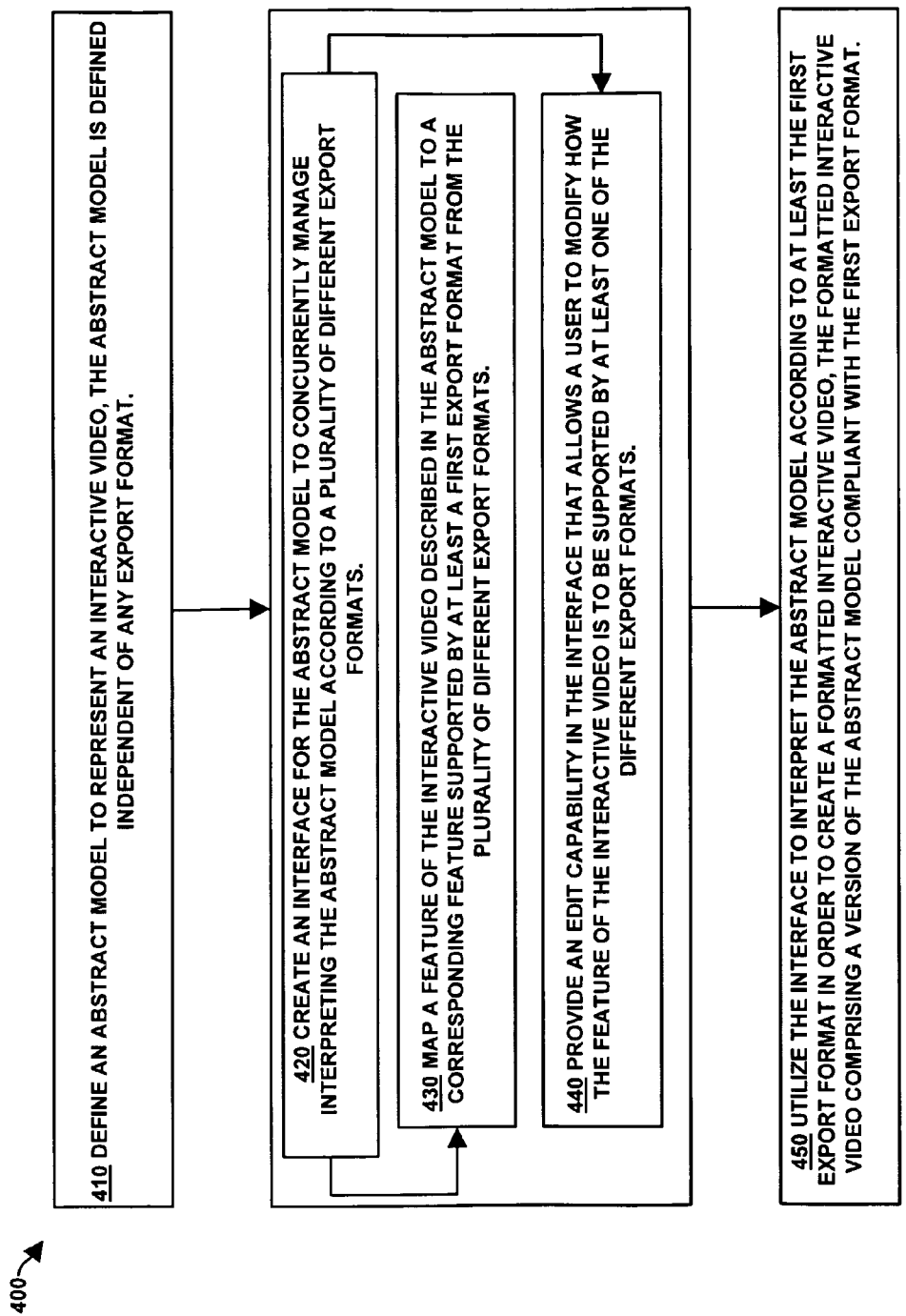
FIG. 4 is a flowchart of an example of processing steps performed by an abstract model interpreter to create a formatted interactive video according to embodiments herein.

FIG. 4 is a flowchart 400 of an example of processing steps performed by an abstract model interpreter 150 to create a formatted interactive video according to embodiments herein. At step 410, the abstract model interpreter 150 defines an abstract model 210 to represent an interactive video. The abstract model 210 is defined independent of any export format.

At step 420, the abstract model interpreter 150 creates an interface 220 for the abstract model 210 to concurrently manage interpreting the abstract model 210 according to a plurality of different export formats (e.g. DVD, Blu-Ray, Flash, etc.).

At step 430, the abstract model interpreter 150 maps a feature 210-2 of the interactive video (e.g. a slideshow 210-1) described in the abstract model 210 to a corresponding feature 230-1, 240-1, 250-1 supported by different export formats.

At step 440, the abstract model interpreter 150 provides an edit capability 260 in the interface 220 that allows a user to modify how the feature 210-2 of the interactive video (e.g. a slideshow 210-1) is to be supported by the different export formats.

At step 450, the abstract model interpreter 150 utilizes the interface 220 to interpret the abstract model 210 according to an export format (or multiple export formats) in order to create a formatted interactive video 230, 240, 250. For example, it is understood that a formatted interactive video 230 is a version of the abstract model 210 compliant with the DVD export format.

Figure 5:
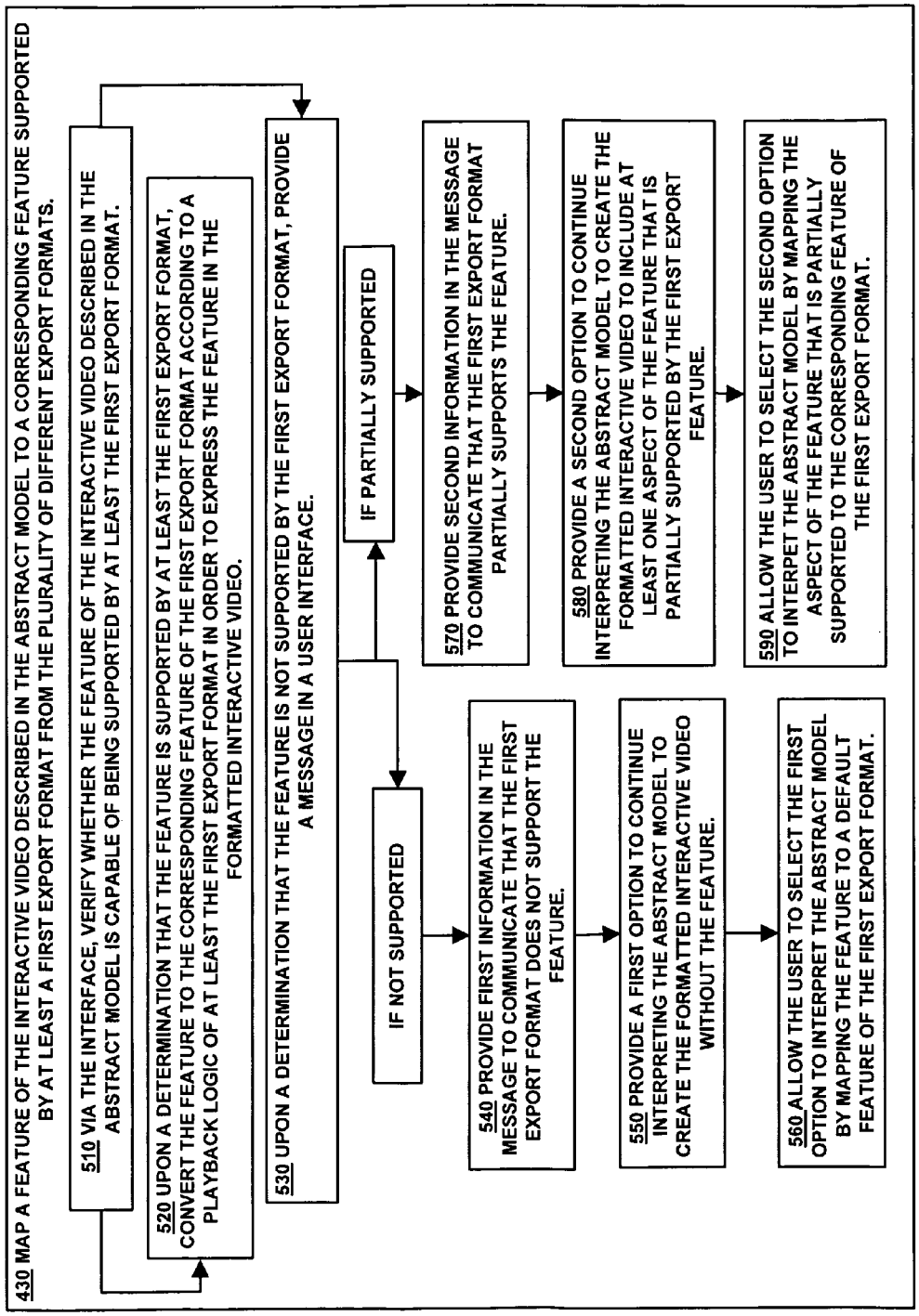
FIG. 5 is a flowchart of an example of processing steps performed by an abstract model interpreter to provide a message in a user interface to communicate that a feature of the interactive video, as described in an abstract model, is not supported or is partially supported by the export format to embodiments herein.

FIG. 5 is a flowchart 500 of an example of processing steps performed by an abstract model interpreter 150 to provide a message in a user interface to communicate that a feature of the interactive video, as described in an abstract model, is not supported or is partially supported by the export format to embodiments herein.

At step 510, via the interface 220, the abstract model interpreter 150 verifies whether the feature 210-2 of the interactive video (e.g. slideshow 210-1) described in the abstract model 210 is capable of being supported by an export format (or multiple export formats).

At step 520, upon a determination that the feature 210-2 is supported by an export format (e.g. Blu-Ray format), the abstract model interpreter 150 converts the feature 210-2 to the corresponding feature 250-1 of the Blu-Ray export format according to the playback logic of the Blu-Ray export format.

By mapping the feature 210-2 according to the Blu-Ray format, the feature can be expressed (see 250-1) in the formatted interactive Blu-Ray video 250.

In another embodiment, at step 530, upon a determination that the feature 210-2 is not supported by an export format (e.g. Flash format), the abstract model interpreter 150 provides a message 300 in a user interface 310.

At step 540, the abstract model interpreter 150 provides first information 310 in the message 300 to communicate that the export format (e.g. Flash format) does not support the feature 210-2.

At step 550, the abstract model interpreter 150 provides a first option 300-2 to continue interpreting the abstract model 210 to create the formatted interactive video (e.g. the Flash video 240) without the feature 210-2.

At step 560, the abstract model interpreter 150 allows the user to select the first option 300-2 to interpret the abstract model 210 by mapping the feature 210-2 to a default feature 260-1 of the export format (e.g. the Flash format). It is understood that the default feature 260-1 can be described in the library of supported features 220-3-2.

In another embodiment, at step 570, the abstract model interpreter 150 provides second information in the message 300 to communicate that an export format (or multiple export formats) partially supports the feature 210-2. For example, the DVD export format can be considered an export format that partially supports the feature 210-2 because the DVD format supports the manual advance of slideshow images but will pause any related audio track as the images are displayed. Hence, the second information of step 570 can be used to communicate to the user that the DVD video 230 will have the manual advance of images 210-2, but any accompanying audio track will be constrained according to the requirements of the DVD format. Further, it is noted that the second information of step 570 can be presented in the user interface 310 in a manner that is similar to the presentation of the first information 310, as shown in FIG. 2.

At step 580, the abstract model interpreter 150 provides a second option to continue interpreting the abstract model 210 to create the formatted interactive video (e.g. DVD video 230) that will include that aspects of the feature 210-2 that are partially supported by the first export format (e.g. D.V.D format). For example, the user will be allowed to decide whether to allow the abstract model interpreter 150 to create a DVD video 230 that will have the manual advance of slideshow images, but will pause the audio track as the images are shown.

At step 590, the abstract model interpreter 150 allows the user to select the second option to interpret the abstract model 210 by mapping the aspect of the feature 210-2 that is partially supported to the corresponding feature 230-1 of the first export format (e.g. D.V.D format).

Figure 6:
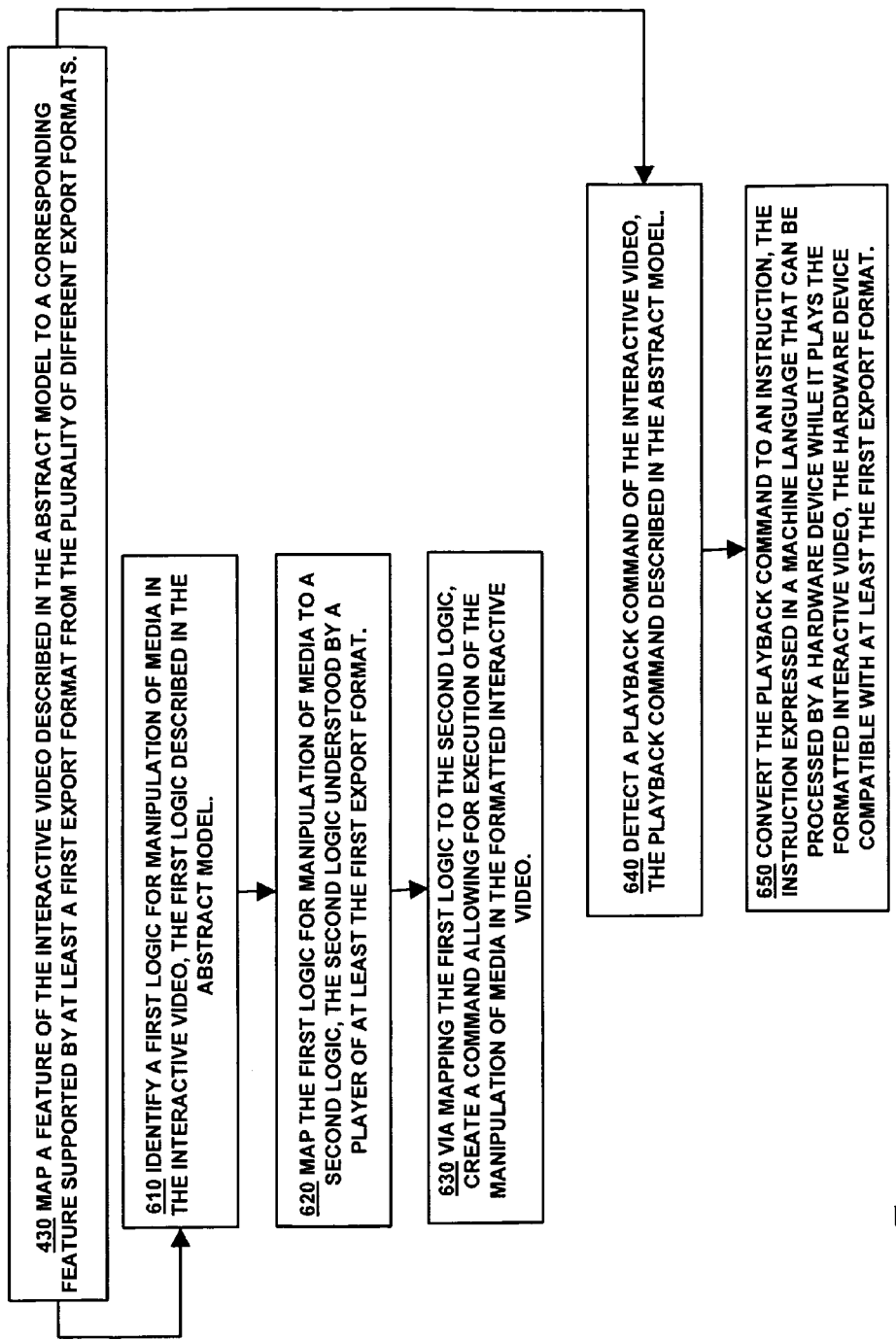
FIG. 6 is a flowchart of an example of processing steps performed by an abstract model interpreter to tag map a feature of the interactive video, as described by an abstract model, to a corresponding feature of an export format according to embodiments herein.

FIG. 6 is a flowchart 600 of an example of processing steps performed by an abstract model interpreter 150 to map a feature of the interactive video, as described by an abstract model, to a corresponding feature of an export format according to embodiments herein.

In one embodiment, at step 610, the abstract model interpreter 150 identifies a first logic 210-3, described in the abstract model 210, for manipulation of media in the interactive video (e.g. slideshow 210-1).

At step 620, the abstract model interpreter 150 maps the first logic 210-3 for manipulation of media to a second logic which can be understood by a player for a formatted version of the abstract model 210 (e.g. a Flash Player playing the Flash video 240). A manipulation of media can be executed by navigation commands. For example, navigation commands on a DVD are a simple program executed in a machine. The DVD player reads a section of a file from the DVD, and executes machine language instruction that do such things as load values into registers and set command bits to cause the DVD player to display different media.

At step 630, via mapping the first logic 210-2 to the second logic, the abstract model interpreter 150 creates a command allowing for execution of the manipulation of media in the formatted interactive video.

In another embodiment, at step 640, the abstract model interpreter 150 detects a playback command of the interactive video (e.g. slideshow 210-1) that is described in the abstract model 210.

At step 650, the abstract model interpreter 150 converts the playback command to an instruction that is expressed in machine language that can be processed by a hardware device while it plays the formatted interactive video. It is noted that the hardware device is be compatible with formatted interactive video's export format.

Figure 7:
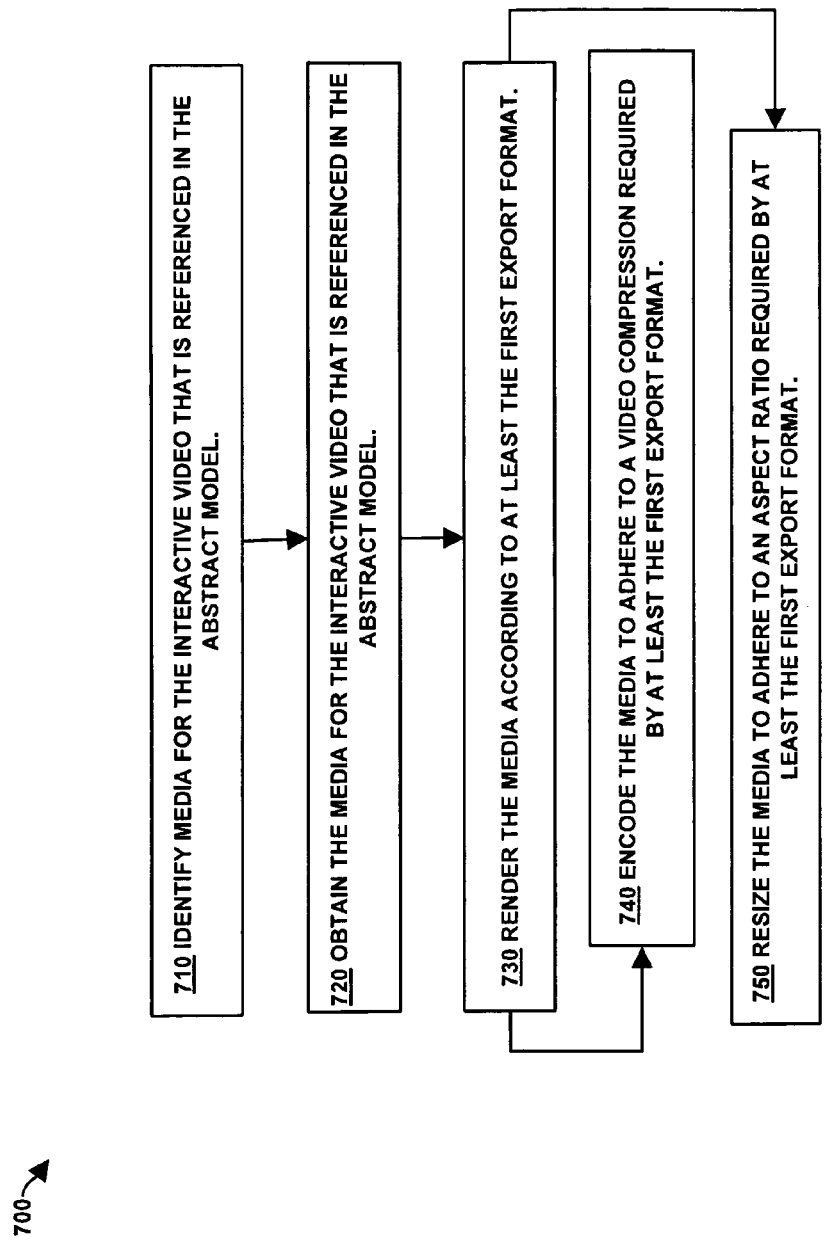
FIG. 7 is a flowchart of an example of processing steps performed by an abstract model interpreter to render media that is referenced in an abstract model according to an export format according to embodiments herein.

FIG. 7 is a flowchart 700 of an example of processing steps performed by an abstract model interpreter 150 to render media that is referenced in an abstract model according to an export format according to embodiments herein.

At step 710, the abstract model interpreter 150 identifies media 210-4 for the interactive video (e.g. slideshow 210-1) that is referenced in the abstract model 210.

At step 720, the abstract model interpreter 150 obtains the media for the interactive video (e.g. slideshow 210-1) that is referenced in the abstract model 210.

At step 730, the abstract model interpreter 150 renders the media according to a given export format(s).

At step 740, the abstract model interpreter 150 encodes the media to adhere to a video compression required by a given export format.

At step 750, the abstract model interpreter 150 resizes the media to adhere to an aspect ratio required by at least the first export format. For example, the interpreters 220-1, 220-2, 220-3 in the interface 220 create representations of the slideshow's menu, which is also described in the abstract model 210. Thus, the menu's video characteristics are interpreted and rendered to conform to the image size constraints of each respective export format.

Note again that techniques herein are well suited for an abstract model interpreter 150 that creates multiple versions of an interactive video encoded according to different export formats. The abstract model interpreter 150 determines how to best emulate the original interactive video's playback logic within the constraints of each target export format.

The abstract model interpreter application 150-1 may be stored on a computer readable medium (such as a floppy disk), hard disk, electronic, magnetic, optical, or other computer readable medium. It is understood that embodiments and techniques discussed herein are well suited for other applications as well.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more processors and/or microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

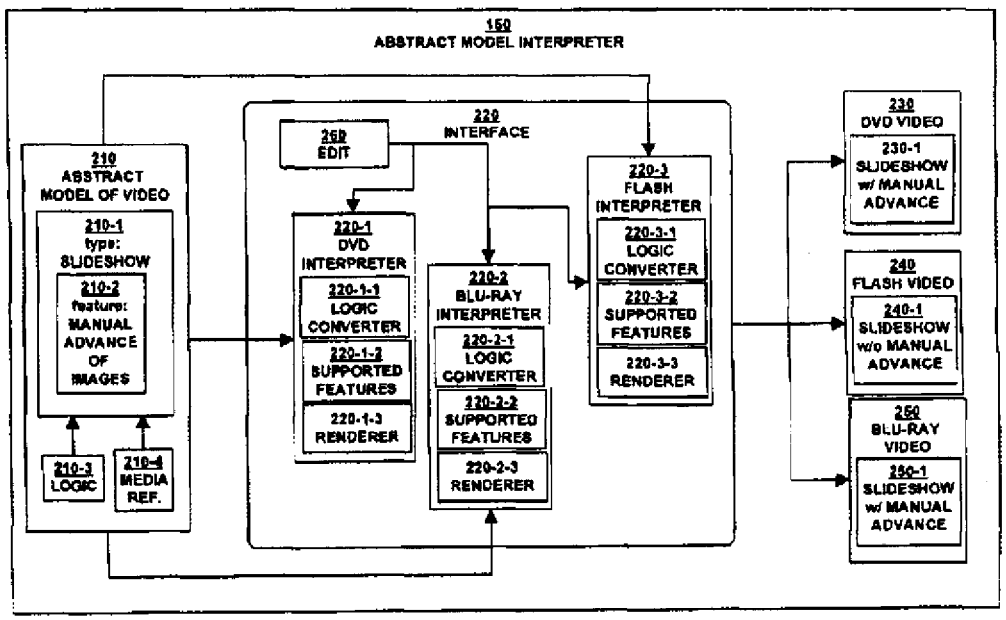

What is claimed is:

1. A method comprising:
defining an abstract model to represent an interactive video, wherein the abstract model is defined independently of any export format; and
interpreting the abstract model to concurrently generate a first version and a second version of the interactive video respectively encoded according to a first export format and a second export format,
wherein interpreting the abstract model to generate the first version and second versions includes:
for at least one feature of the interactive video described in the abstract model identifying a first player function provided by the first export format and a second player function provided by the second export format, wherein the first and second player functions implement the at least one feature under different conditions,
generating first code for implementing the first player function and second code for implementing the second player function, and
including the first code in the first version of the interactive video and the second code in the second version of the interactive video,
wherein generating the first code and the second code comprises:
identifying a condition for activating the at least one feature in the first export format, wherein the condition is absent in the second export format; and
specifying that the first code is executable when the condition is satisfied, wherein the second code is executable without the condition being satisfied.

2. The method as in claim 1, wherein the abstract model is not encoded to any specific export format such that the abstract model cannot be independently rendered.

3. The method as in claim 1,
wherein the first export format comprises at least one of a digital video disc format, a blue-ray format, and a Flash format,
wherein the second export format comprises at least another of the digital video disc format, the blue-ray format, and the Flash format.

4. The method of claim 1, further comprising:
determining that a third export format does not support the at least one feature;
identifying an additional feature similar to the at least one feature that is supported by the third export format; and generating third code for implementing the additional feature in a third version of the interactive video.

5. The method of claim 1, wherein the at least one feature comprises a first feature and a second feature performed in combination with one another, the method further comprising:
determining that at least one of the first export format and the second export format supports the first feature but not the second feature; and
omitting the second feature from at least one of the first code and the second code.

6. The method of claim 1, wherein the at least one feature comprises a first feature and a second feature, the method further comprising:
determining that at least one of the first export format and the second export format supports the first feature but not the second feature;
identifying an additional feature similar to the second feature that is supported by the at least one of the first export format and the second export format; and
generating code for implementing the additional feature for inclusion in at least one of the first code and the second code.

7. The method of claim 1, wherein generating the first code and the second code comprises:
identifying a condition for activating the at least one feature in the first export format, wherein the condition is absent in the second export format; and
specifying that the first code is executable when the condition is satisfied, wherein the second code is executable without the condition being satisfied.

8. The method of claim 7, wherein the condition comprises a state of a media player compatible with the first export format.

9. The method of claim 8, wherein the at least one feature comprises manually advancing frames of the interactive video and the state comprises pausing audio content associated with the interactive video.

10. The method of claim 1, further comprising:
providing an interface for managing interpretation of the abstract model to generate the first and second versions of the interactive video, wherein the interface comprises:
a mapping capability for mapping features of the interactive video described in the abstract model to corresponding features supported by at least one of the first and second export formats,
an edit capability in the interface for modifying how the features of the interactive video are to be supported by at least one of the first and second export formats; and
a creation capability for interpreting the abstract model according to at least one of the first and second export formats to create at least one of the first or second versions of the interactive video.

11. The method of claim 10, wherein mapping the features of the interactive video described in the abstract model to the corresponding features supported by the at least one of the first and second export formats comprises:
detecting a playback command of the interactive video, the playback command described in the abstract model; and
converting the playback command to an instruction, the instruction expressed in a machine language that can be processed by a hardware device while it plays the formatted interactive video, the hardware device compatible with at least one of the first export format and the second export format.

12. The method of claim 10, wherein providing the edit capability in the interface comprises at least one of:
providing a first interface control for modifying a video compression required by at least one of the first and second export formats; and
providing a second interface control for modifying an aspect ratio required by at least one of the first and second export formats.

13. The method of claim 10, wherein mapping the features of the interactive video described in the abstract model to the corresponding features supported the at least one of the first and second export formats comprises:
identifying a first logic for manipulation of media in the interactive video, the first logic described in the abstract model;
mapping the first logic for manipulation of media to a second logic, the second logic understood by a player of at least one of the first export format and the second export format; and
via mapping the first logic to the second logic, creating a command allowing for execution of the manipulation of media in the formatted interactive video.

14. The method of claim 13, wherein identifying the first logic for manipulation of media in the interactive video includes:
identifying a navigation command for navigating from a first portion of the interactive video to a second portion of the interactive video.

15. The method of claim 10, further comprising:
identifying media for the interactive video that is referenced in the abstract model in response to receiving input invoking the creation capability;
obtaining the media for the interactive video that is referenced in the abstract model; and
rendering the media according to at least one of the first and second export formats.

16. The method of claim 15, wherein rendering the media comprises at least one of:
encoding the media to adhere to a video compression required by the at least one of the first and second export formats; and
resizing the media to adhere to an aspect ratio required by at least one of the first and second export formats.

17. The method of claim 10, further comprising:
determining that an additional feature specified in the abstract model is not supported by at least one export format; and
responsive to determining that the additional feature is not supported, providing a message in the interface indicating that the additional feature is not supported.

18. The method of claim 17, wherein providing the message in the interface includes:
providing an option in the interface for creating the formatted interactive video without the additional feature; and
mapping the additional feature to a default feature of the at least one export format in response to input received to the interface selecting the option.

19. The method of claim 17, wherein providing the message in the interface includes:
providing information in the message indicating that the at least one export format partially supports the additional feature;
providing an option in the interface for creating the formatted interactive video to include at least one aspect of the additional feature that is partially supported by the at least one export format; and mapping the at least one aspect of the additional feature to a corresponding feature of the first export format in response to input received to the interface selecting the option.

20. The method as in claim 19, wherein mapping the at least one aspect of the additional feature that is partially supported to the corresponding feature of the at least one export format includes:
   identifying at least one video interface control for the at least one aspect, the at least one video interface control defined in the abstract model;
   responsive to input received via the interface, disabling a portion of the at least one video interface control that relates to an additional aspect of the additional feature that is not supported by the at least one export format;
   responsive to additional input received via the interface, redefining the at least one video interface control to be operative with respect the at least one aspect that is partially supported; and
   including the at least one video interface control in the formatted interactive video.

21. A non-transitory computer readable medium comprising executable instructions encoded thereon operable on a computerized device to perform processing comprising:
   instructions for defining an abstract model to represent an interactive video, wherein the abstract model is defined independently of any export format; and
   instructions for interpreting the abstract model to concurrently generate a first version and a second version of the interactive video respectively encoded according to a first export format and a second export format, wherein interpreting the abstract model to generate the first version and second versions interface includes:
   for at least one feature of the interactive video described in the abstract model identifying a first player function provided by the first export format and a second player function provided by the second export format, wherein the first and second player functions implement the at least one feature under different conditions,
   generating first code for implementing the first player function and second code for implementing the second player function, and
   including the first code in the first version of the interactive video and the second code in the second version of the interactive video,
   wherein generating the first code and the second code comprises:
   identifying a condition for activating the at least one feature in the first export format, wherein the condition is absent in the second export format; and
   specifying that the first code is executable when the condition is satisfied, wherein the second code is executable without the condition being satisfied.

22. A computer system comprising:
   a processor;
   a memory unit that stores instructions associated with an application executed by the processor; and
   an interconnect coupling the processor and the memory unit, wherein the processor is configured to execute the application and perform operations of:
   defining an abstract model to represent an interactive video independent of any export format;
   interpreting the abstract model to concurrently generate a first version and a second version of the interactive video respectively encoded according to a first export format and a second export format;
   for at least one feature of the interactive video described in the abstract model identifying a first player function provided by the first export format and a second player function provided by the second export format, wherein the first and second player functions implement the at least one feature under different conditions,
   generating first code for implementing the first player function and second code for implementing the second player function, and
   including the first code in the first version of the interactive video and the second code in the second version of the interactive video,
   wherein generating the first code and the second code comprises:
   identifying a condition for activating the at least one feature in the first export format, wherein the condition is absent in the second export format; and
   specifying that the first code is executable when the condition is satisfied, wherein the second code is executable without the condition being satisfied.

* * * * *

UNITED STATES PATENT AND TRADEMARK OFFICE
CERTIFICATE OF CORRECTION

PATENT NO.         : 8,687,945 B2
APPLICATION NO.    : 11/951497
DATED              : April 1, 2014
INVENTOR(S)        : Thomas E. Bednarz, Jr. and Norman A. Stratton It is certified that error appears in the above-identified patent and that said Letters Patent is hereby corrected as shown below:

Delete Title Page, and replace with new Title Page (Attached)

In the Claims

Column 13, Claim 7, Lines 25-32
Delete the entire claim 7

Column 13, Claim 8, Line 33
Delete "7"
Insert --1--

Signed and Sealed this
Sixth Day of January, 2015

Michelle K. Lee
*Deputy Director of the United States Patent and Trademark Office*

(12) United States Patent
Bednarz, Jr. et al.

(10) Patent No.: US 8,687,945 B2
(45) Date of Patent: Apr. 1, 2014

(54) EXPORT OF PLAYBACK LOGIC TO MULTIPLE PLAYBACK FORMATS

(75) Inventors: Thomas E. Bednarz, Jr., Natick, MA (US); Norman A. Stratton, Littleton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1478 days.

(21) Appl. No.: 11/951,497

(22) Filed: Dec. 6, 2007

(65) Prior Publication Data
US 2014/0013229 A1  Jan. 9, 2014

(51) Int. Cl.
*G11B 27/00* (2006.01)
*H04N 5/93* (2006.01)
*H04N 9/80* (2006.01)

(52) U.S. Cl.
USPC ............ 386/278; 386/239; 386/240; 386/248

(58) Field of Classification Search
USPC ..................... 386/232, 278–290, 239–240
See application file for complete search history.

(56) References Cited

U.S. PATENT DOCUMENTS

| 2004/0136698 | A1* | 7/2004 | Mock | 386/123 |
| 2004/0223740 | A1* | 11/2004 | Itoi | 386/95 |
| 2009/0044117 | A1* | 2/2009 | Vaughan et al. | 715/716 |

* cited by examiner

*Primary Examiner* — Hung Dang
(74) *Attorney, Agent, or Firm* — Kilpatrick Townsend & Stockton LLP

(57) ABSTRACT

Methods and apparatus provide for an abstract model interpreter that defines an abstract model to represent an interactive video. The abstract model is defined independent of any export format. An interface for the abstract model is created to concurrently manage interpreting the abstract model according to a plurality of different export formats. For example, the abstract model interpreter can map a feature of the interactive video, which is described in the abstract model, to a corresponding feature supported by an export format. The interface is thereby utilized to interpret the abstract model to create a formatted interactive video, which is a version of the abstract model compliant with an export format from the plurality of different export formats. The interface further provides an edit capability that allows a user to modify how the feature of the interactive video is to be supported by any of the different export formats.

21 Claims, 7 Drawing Sheets